United States Patent
Chang

(10) Patent No.: US 9,852,712 B2
(45) Date of Patent: Dec. 26, 2017

(54) SYSTEM FOR SYNCHRONIZING DISPLAY OF DATA TRANSMITTED WIRELESSLY

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 80 days.

(21) Appl. No.: 15/132,263

(22) Filed: Apr. 19, 2016

(65) Prior Publication Data

US 2016/0351167 A1    Dec. 1, 2016

(30) Foreign Application Priority Data

May 28, 2015 (CN) .......................... 2015 1 0281211

(51) Int. Cl.
*G09G 5/12* (2006.01)
*G06F 3/14* (2006.01)

(52) U.S. Cl.
CPC .............. *G09G 5/12* (2013.01); *G06F 3/1423* (2013.01); *G06F 3/1454* (2013.01); *G09G 2370/16* (2013.01)

(58) Field of Classification Search
CPC ................ G06F 3/1446; G06F 3/1454; G09G 2300/026; G09G 5/12
See application file for complete search history.

(56) References Cited

U.S. PATENT DOCUMENTS

| 2008/0117329 A1* | 5/2008 | Wyman | .................. H04N 7/012 348/448 |
| 2012/0224105 A1* | 9/2012 | Horikoshi | ................ G09G 5/12 348/607 |

* cited by examiner

*Primary Examiner* — Insa Sadio
(74) *Attorney, Agent, or Firm* — ScienBiziP, P.C

(57) ABSTRACT

A system for synchronizing displays of data transmitted wirelessly, the system includes a source device outputting a first video signal, a signal processing device connected to the source device, and a plurality of display devices connected to the signal processing device. The signal processing device transforms the first video signal to a second video signal. Display devices receive the second video signal from the signal processing device wirelessly and display the second video signal. The signal processing device includes a timer, the timer is configured to calculate a first time interval for transmitting a signal between the signal processing device and the display devices. The signal processing device transforms the first video signal in accordance with the first control signal, a footage of the second video signal is longer than the first time interval and a file size of the second video signal is smaller than the expected signal.

8 Claims, 2 Drawing Sheets

SYSTEM FOR SYNCHRONIZING DISPLAY OF DATA TRANSMITTED WIRELESSLY

FIELD

The subject matter herein generally relates to a system for synchronizing displays based on wireless interconnections.

BACKGROUND

In general, a projector projecting an image or playing a video on a display screen is often used for a presentation of commercial products or business reports within a meeting or a conference room. It is important that the image or video is displayed smoothly and stably.

BRIEF DESCRIPTION OF THE DRAWINGS

Many aspects of the disclosure can be better understood with reference to the following drawings. The components in the drawing are not necessarily drawn to scale, the emphasis instead being placed upon clearly illustrating the principles of the disclosure. Implementations of the present technology will now be described, by way of example only, with reference to the attached figures.

DETAILED DESCRIPTION

Figure 1:
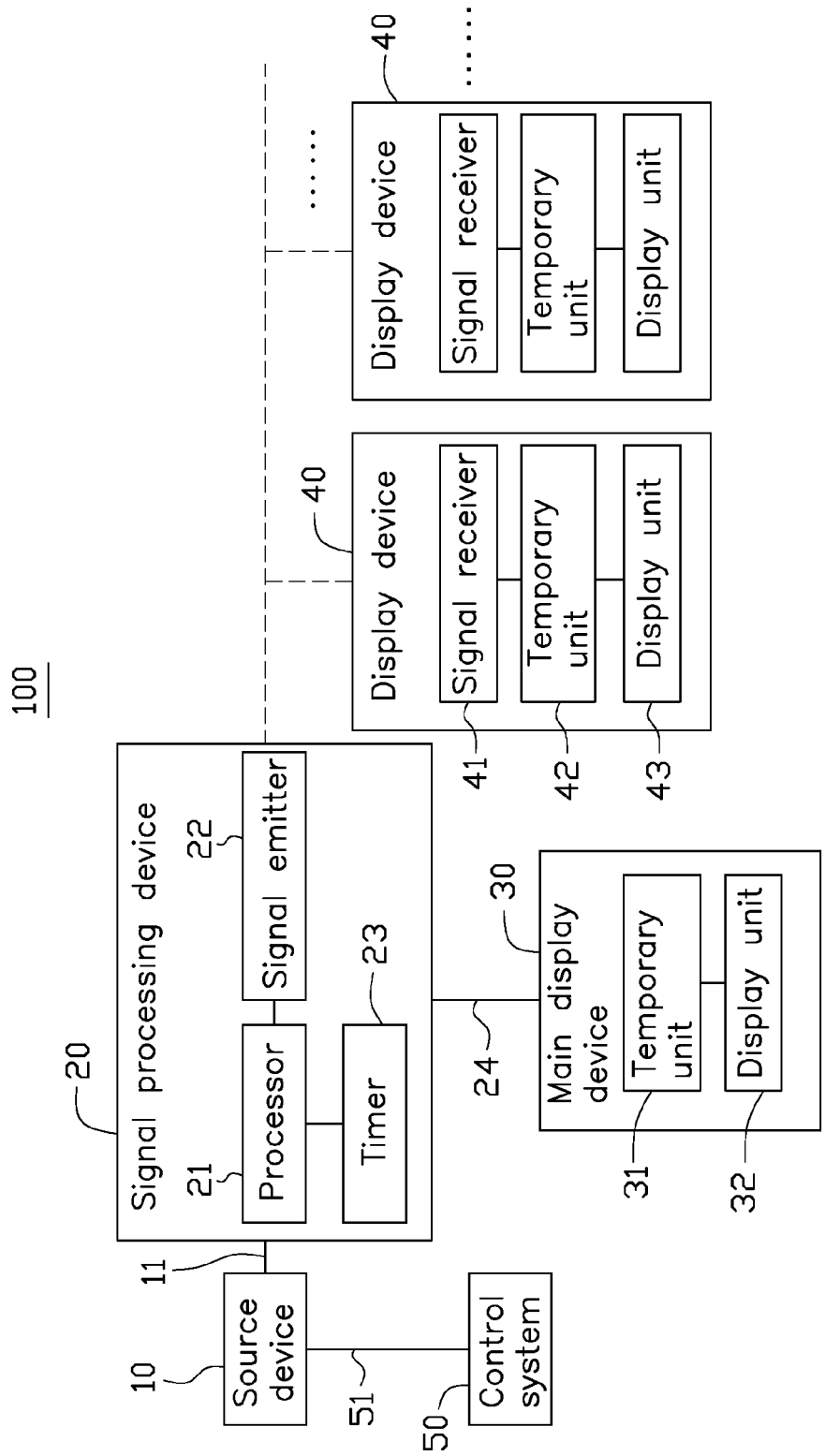
FIG. 1 is a block diagram illustrating a first embodiment of a system for synchronizing displays.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to;" it specifically indicates open-ended inclusion or membership in the so-described combination, group, series and the like.

The present disclosure relates to a system for synchronized displaying via wireless interconnections.

FIG. 1 is a block diagram illustrating a first embodiment of a system 100 for synchronized displaying. The system 100 includes a source device 10, a signal processing device 20, a main display device 30, a plurality of display devices 40, and a control system 50.

The source device 10 is configured to output a first video signal. In the first embodiment, the source device 10 is a server. In at least one embodiment, the source device 10 is a cloud server.

The signal processing device 20 is connected to the source device 10. In the first embodiment, the signal processing device 20 is connected to the source device 10 via one or more wires. In the first embodiment, the signal processing device 20 is connected to the source device 10 via a wire 11. In at least one embodiment, the signal processing device 20 is connected wirelessly to the source device 10. The signal processing device 20 is configured to process the first video signal by transforming it into a second video signal and outputting the second video signal. The signal processing device 20 includes a processor 21, a signal emitter 22, and a timer 23.

The processor 21 is configured to process the first video signal from the source device 10 and transform the first video signal into a second video signal. The signal emitter 22 is connected to the processor 21 and outputs the second video signal wirelessly. The display devices 40 receives the second video signal and displays the second video signal. In the first embodiment, the signal emitter 22 is an omni-directional antenna. In at least one embodiment, the signal emitter 22 is a directional antenna. The timer 23 is connected to the processor 21. The timer 23 is configured to calculate a time interval for transmitting an expected signal between the signal processing device 20 and the display devices 40 and outputs a control signal to the processor 21. The processor 21 transforms the first video signal according to the control signal and outputs the second video signal, a footage of the second video signal is longer than the time interval and a file size of the second video signal is smaller than the expected signal. The processor 21 can command the signal emitter 22 to output an activating signal, the activating signal is used to activate the main display device 30 and the display devices 40 which display the second video signal.

The main display device 30 and the display devices 40 each includes a temporary unit 31 (temporary unit 42 in the display devices 40), and a display unit 32 (display unit 43 in the display devices 40).

The main display device 30 is connected to the processor 21 of the signal processing device 20 via one or more wires. In the first embodiment, the main display device 30 is connected to the processor 21 via the wire 24. In the first embodiment, the main display device 30 is a computer with a display device. In other embodiments, the main display device 30 is a mobile device with a display device such as a smart phone, or a tablet computer. In at least one embodiments, the main display device 30 is a wearable computer device with a display device such as a smart watch, or a smart glass. The temporary unit 31 is configured to store the second video signal. The display unit 32 is connected to the temporary unit 31 and is configured to display the second video signal stored in the temporary unit 31.

The display devices 40 are coupled to the signal processing device 20 wirelessly and are configured to receive the second video signal wirelessly from the signal emitter 22 of the signal processing device 20 via a wireless transmission. The display devices 40 display the second video signal. In the first embodiment, the display device 40 is a computer with a display device. In other embodiments, a display device 40 is a mobile device with a display. The mobile device may be a smart phone or a tablet computer. In at least one embodiments, the display device 40 is a wearable computer device with a display device such as a smart watch, or a smart glass. The display device 40 also includes a signal receiver 41 configured to receive the second video signal. The temporary unit 42 is connected to the signal receiver 41 and is configured to store the second video signal. The display unit 43 is connected to the temporary unit 42 and displays the second video signal saved in the temporary unit 42. The wireless transmission between the signal receiver 41 and the signal emitter 22 is subject to wireless identification. The signal receiver 41 can receive the second video signal via authentication of identification wirelessly.

The control system 50 is connected to the source device 10. In the first embodiment, the control system 50 is connected to the source device 10 via a wire 51. In at least one embodiment, the control system 50 is connected wirelessly to the source device 10. In the first embodiment, the control system 50 is a mouse with wires. In other embodiments, the control system 50 can be a wireless mouse, a keyboard, or a motion sensing controller. The control system 50 is configured to control the source device 10 to output the first video signal.

The control system 50 can be used to control the source device 10 to output the first video signal, the source device 10 transmitting the first video signal to the signal processing device 20. The processor 21 of the signal processing device 20 processes the first video signal and the signal emitter 22 transmits the expected signal to the main display device 30 and the display devices 40. The timer 23 calculates the transmitting time interval for the expected signal and outputs the control signal to the processor 21. The processor 21 receives the control signal and transforms the first video signal into a second video signal. The signal emitter 22 wirelessly transmits the second video signal to the main display device 30 and the display devices 40. Each of the main display device 30 and the display devices 40 saves the second video signal in the temporary units 31 and 42 respectively. When the activating signal is transmitted to the main display device 30 and the display device 40 from the signal emitter 22, the display unit 32 of the main display device 30 and the display unit 43 of the display devices 40 display the second video signal at substantially the same time.

The timer 23 can calculate the time interval continuously, and the signal emitter 22 outputs third video signals and the activating signal in accordance with the timer 23. The main display device 30 and the display devices 40 receive the third video signals and the activating signal when the second video signal is displayed. The third video signals will be displayed when the display of the second video signal is finished. After completion of display of the second video signal and then the third video signal, the main display device 30 and the display devices 40 can stop displaying until the activating signal is received again. The main display device 30 can display user instructions for how to control the source device 10 by the control system 50.

Figure 2:
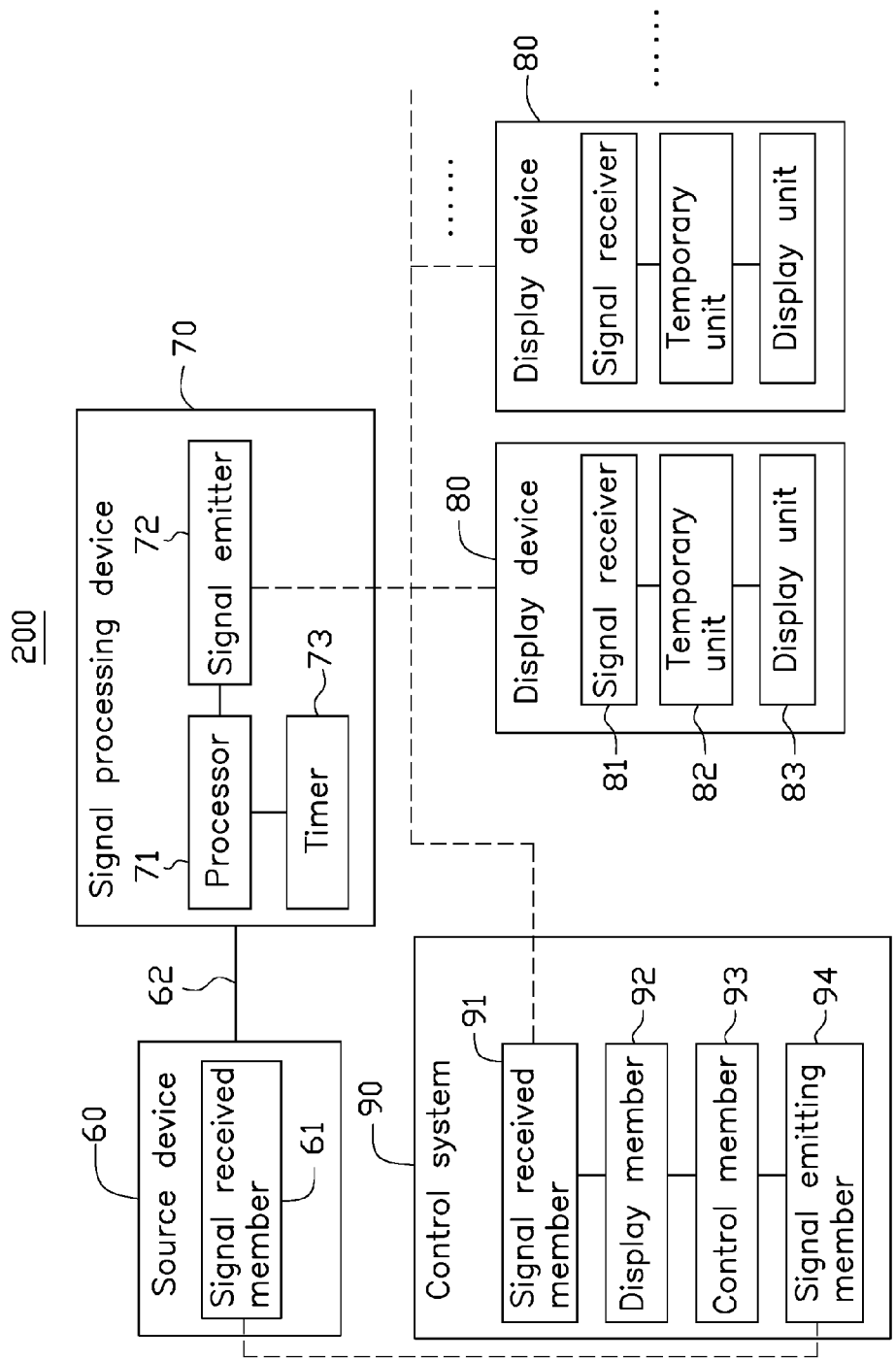
FIG. 2 is a block diagram illustrating a second embodiment of a system for synchronizing displays.

FIG. 2 is a block diagram illustrating a second embodiment of a system 200 for displaying in synchronization. The system 200 includes a source device 60, a signal processing device 70, a plurality of display devices 80, and a control system 90.

The source device 60 includes a signal receiving member 61. The signal receiving member 61 is configured to receive a control signal, the source device 60 is configured to output a first video signal following receipt of the control signal. In the second embodiment, the source device 60 is a server. In at least one embodiment, the source device 60 is a cloud server.

The signal processing device 70 is connected to the source device 60. In the second embodiment, the signal processing device 70 is connected to the source device 60 with one or more wires (wire 62). In at least one embodiment, the signal processing device 70 is connected wirelessly to the source device 60. The signal processing device 70 is configured to process the first video signal and transform the first video signal into a second video signal and output the second video signal. The signal processing device 70 includes a processor 71, a signal emitter 72, and a timer 73.

The processor 71 is configured to process the first video signal from the source device 60 and transform the first video signal into a second video signal. The signal emitter 72 is connected to the processor 71 and is configured to output the second video signal wirelessly, the display devices 80 receives the second video signal and displays the second video signal. In the second embodiment, the signal emitter 72 is an omni-directional antenna. In at least one embodiment, the signal emitter 72 is a directional antenna. The timer 73 is connected to the processor 71. The timer 73 is configured to calculate a time interval for transmitting an expected signal between the signal processing device 70 and the display devices 80, and outputs a control signal accordingly to the processor 71. The processor 71 transforms the first video signal according to the control signal and outputs the second video signal, a footage of the second video signal is longer than the time interval and a file size of the second video signal is smaller than the expected signal. The processor 71 can command the signal emitter 72 to output an activating signal, the activating signal is used to activate the display devices 80 to display the second video signal.

The display devices 80 are connected the signal processing device 70 wirelessly and are configured to receive the second video signal from the signal emitter 72 of the signal processing device 70 wirelessly. In the first embodiment, the display device 80 is a computer with a display device. In other embodiments, the display device 80 is a mobile device with a display device such as a smart phone, or a tablet computer. In at least one embodiments, the display device 80 is a wearable computer device with a display device such as a smart watch, or a smart glass. The display device 80 includes a signal receiver 81, a temporary unit 82, and a display unit 83. The signal receiver 81 is configured to receive the second video signal. The temporary unit 82 is connected to the signal receiver 81 and is configured to save the second video signal. The display unit 83 is connected to the temporary unit 82 and is configured to display the second video signal saved in the temporary unit 82 when the display device 80 receives the activating signal. Wireless identification between the signal receiver 81 and the signal emitter 72 can be carried out, then the signal receiver 81 can receive the second video signal wirelessly.

The control system 90 is connected to the source device 60. In the second embodiment, the control system 90 is connected to the source device 60 wirelessly. In the second embodiment, the control system 90 is a Head-Up display glass. The control system 90 is configured to control the source device 60. The control system 90 includes a signal receiving member 91, a display member 92, a control member 93, and a signal emitting member 94. The signal receiving member 91 receives the second video signal from the signal emitter 72 of the signal processing device 70 and the display member 92 is configured to display the second video signal. A user can use the control member 93 to output the control signal, the signal emitting member 94 is configured to transmit the control signal to the source device 60. In the second embodiment, the control member 93 is a video playback control device such as that in Chinese patent application publication No. 104320688, the control signal being determined by obtaining the eye movements of the user.

The embodiments shown and described above are only examples. Many details are often found in the art such as the other features of a system for displaying in synchronization with wireless interconnection. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A system for synchronizing displays of data transmitted wirelessly, comprising:
    a source device configured for outputting a first video signal;
    a signal processing device connected to the source device and configured for transforming the first video signal into a second video signal; and
    a plurality of display devices connected to the signal processing device, the display devices configured for receiving the second video signal from the signal processing device via wireless transmissions and displaying the second video signal;
    wherein the signal processing device includes a timer, the timer is configured to calculate a first time interval for transmitting an expected signal between the signal processing device and the display devices, and outputs a first control signal, the signal processing device transforms the first video signal according to the first control signal, a time duration of displaying the second video signal is longer than the first time interval and a file size of the second video signal is smaller than a file size of the expected signal, the display device includes a signal receiver, a temporary storage device connected to the signal receiver, and a display connected to the temporary storage device, the signal receiver is configured to receive the second video signal from the signal processing device, the temporary storage device is configured to save the second video signal, the display is configured to display the second video signal.

2. The system in accordance with claim 1, wherein the system includes a control system, the control system is configured to control the source device to output the first video signal.

3. The system in accordance with claim 2, wherein the control system is connected to the source device via a wire.

4. The system in accordance with claim 2, wherein the control system is connected wirelessly to the source device.

5. The system in accordance with claim 2, wherein the display devices are a wearable device.

6. The system in accordance with claim 2, wherein the control system includes a signal emitting member, a display member, a control member, and a signal receiving member, the signal receiving member receives the second video signal from the signal processing device, the display member is configured to display the second video signal, the control member is configured to output a second control signal by user, the signal emitting member is configured to transmit the second control signal to the source device.

7. The system in accordance with claim 2, wherein the system includes a main display device connected to the signal processing device via a wire.

8. The system in accordance with claim 1, wherein the signal processing device includes a processor connected to the timer, and a signal emitter connected to the processor, the processor is configured to process the first video signal from the source device, the signal emitter is configured to output the second video signal wirelessly.

* * * * *